US009369211B2

(12) United States Patent
Huang et al.

(10) Patent No.: US 9,369,211 B2
(45) Date of Patent: Jun. 14, 2016

(54) OPTICAL SQUARE QAM SIGNAL EMULATION USING ALL-OPTICAL PAM TO QAM SIGNAL CONVERSION

(71) Applicant: NEC Laboratories America, Inc., Princeton, NJ (US)

(72) Inventors: Yue Kai Huang, Princeton, NJ (US); Shaoliang Zhang, Plainsboro, NJ (US); Ezra Ip, Plainsboro, NJ (US)

(73) Assignee: NEC Corporation (JP)

( * ) Notice: Subject to any disclaimer, the term of this patent is extended or adjusted under 35 U.S.C. 154(b) by 34 days.

(21) Appl. No.: 14/511,560

(22) Filed: Oct. 10, 2014

(65) Prior Publication Data

US 2015/0104192 A1    Apr. 16, 2015

Related U.S. Application Data

(60) Provisional application No. 61/890,379, filed on Oct. 14, 2013.

(51) Int. Cl.
*H04B 10/04*  (2006.01)
*H04B 10/54*  (2013.01)
*H04B 10/67*  (2013.01)

(52) U.S. Cl.
CPC ............ *H04B 10/541* (2013.01); *H04B 10/676* (2013.01); *H04B 2210/516* (2013.01)

(58) Field of Classification Search
CPC .......................... H04B 10/524; H04B 10/541
See application file for complete search history.

(56) References Cited

U.S. PATENT DOCUMENTS

| 6,424,444 | B1 * | 7/2002 | Kahn ................. | H04B 10/5161 398/141 |
| 2012/0213522 | A1 * | 8/2012 | Zhang .................... | H04J 14/02 398/82 |
| 2013/0070254 | A1 * | 3/2013 | Winzer ................... | H04J 14/02 356/478 |
| 2013/0195455 | A1 * | 8/2013 | Jansen ................. | H04B 10/506 398/65 |
| 2013/0294777 | A1 * | 11/2013 | Willner ................. | H04J 14/002 398/78 |

* cited by examiner

*Primary Examiner* — Dzung Tran
(74) *Attorney, Agent, or Firm* — Joseph Kolodka

(57) ABSTRACT

An optical communication method includes converting an optical pulse amplitude modulation (PAM) signal to a square QAM signal using an optical delay interferometer (DI) to perform all-optical PAM to QAM conversion in the DI; performing optical de-correlation of I and Q tributaries of the QAM signal to avoid frequency dependent attenuation in RF cabling which impacts signal quality; and finding optimal phase control mechanism of the DI by monitoring and equalizing down-converted I and Q electrical signal amplitudes, using coherent detection; and emulating a square quadrature amplitude modulation (QAM) optical signal with duplicated data copies.

18 Claims, 5 Drawing Sheets

OPTICAL SQUARE QAM SIGNAL EMULATION USING ALL-OPTICAL PAM TO QAM SIGNAL CONVERSION

This application claims priority to Provisional Application 61/890,379 filed Oct. 14, 2013, the content of which is incorporated by reference.

BACKGROUND

Riding on the success of digital coherent technology in 100G systems deployment, optical quadrature amplitude modulation (QAM) with larger signal constellation maps, such as 16-QAM or 32-QAM, has become the main theme in optical communication research for the quest to achieve the next channel capacity such 400 Gb/s or 1 Tb/s. By using a larger QAM constellation maps, channel spectral efficiency can be improved from the current 100G DP-QPSK technology so that larger fiber data capacity can be supported. To generate optical QAM, typically two streams of multiple-level electrical baseband signal will be used to drive the two arms (in-phase and quadrature) of an integrated nested Mach-Zehnder modulator (MZM). In some cases such as laboratory evaluation purpose, however, the two arms are driven using the same data copies, or data copies with opposite polarities, with RF de-correlation delay lines to save cost. The commercially available RF de-correlation delay lines are inherently bulky, have bandwidth limitation (40~50 GHz), and have slow frequency roll-off response which could worsen and affect the signal integrity when the cable length increases. If the QAM signal baud-rate is large, another factor to consider is the bandwidth of the optical modulator. Typically, integrated nested MZMs, or optical I/Q modulators, have lower bandwidths compare to regular intensity MZMs due to its design where other parameters such as I/Q balancing and size limitations. Commercial I/Q modulators typically have bandwidths below 25 GHz with very few reaching more than 30 GHz. Therefore, it is still very difficult to evaluate system performance for 400 Gb/s DP-16QAM channel using just a single optical modulator.

Kylia, a fiber-optic device manufacturer for the telecom networks using free-space optic technology, offers two commercial products for optical QAM signal (16-QAM or 64-QAM) emulation. Both emulators utilize free-space optical delay interferometer technique and require optical QPSK signals to be used as inputs. Sine optical I/Q modulator needs to be used for QPSK signal generation, the signal baud-rate will be limited by the I/Q modulator bandwidth and the RF cables if I/Q data de-correlation is used. Moreover, their scheme requires very precise amplitude and phase control on the multiple optical paths in order to obtain the correct QAM constellation at the interferometer output with no simple way to make phase adjustments other than detecting and recovering the QAM constellation.

ZTE Corporation's converting optical QPSK to 16-QAM signal method involves carving the transition edge of an optical NRZ QPSK signal, which has four distinctive amplitude levels at each quadrature. The produced result will resemble a 16-QAM constellation, however the adjacent symbols are highly correlated and therefore unsuitable for actual performance analysis. Also, optical I/Q modulator and RF delay line for de-correlation are required.

SUMMARY

In one aspect, a de-correlation between the in-phase and quadrature part of the QAM signal is done all-optically, which has much smaller footprint and no bandwidth limitation on the operating signal baud-rate.

In another aspect, an optical communication method includes converting an optical pulse amplitude modulation (PAM) signal to a square QAM signal using an optical delay interferometer (DI) to perform all-optical PAM to QAM conversion in the DI; performing optical de-correlation of I and Q tributaries of the QAM signal to avoid frequency dependent attenuation in RF cabling which impacts signal quality; and finding optimal phase control mechanism of the DI by monitoring and equalizing down-converted I and Q electrical signal amplitudes, using coherent detection; and emulating a square quadrature amplitude modulation (QAM) optical signal with duplicated data copies.

Implementations of the above aspects can include one or more of the following. The method includes emulating the square QAM by using duplicated and de-correlated PAM copies; converting any N-point optical PAM constellation to $N^2$ point PAM constellation; using the PAM signal generated by an optical intensity modulator for PAM to QAM converter input; and starting with the electrical baseband PAM signal (generated either by signal addition or by analog-to-digital converter), for optical PAM to QAM conversion. The method also includes using two arms of the optical DI for de-correlating the I and Q copies of the QAM signal; and ensuring the path difference between the two paths to be a multiple integer of a target QAM symbol rate. The method also includes using the optical DI with equal splitting ratio for QAM signal; adjusting the relative optical phase difference between the two DI arms to generate the square QAM signal; and a simple phase tuning to achieve optimized QAM constellation by monitoring and equalizing the I and Q amplitudes after coherently detecting the QAM signal using the same laser as a local oscillator (LO).

In terms of input signal requirement, instead of using optical QPSK, our method uses pulse amplitude modulation (PAM) signal. This way we can avoid using I/Q modulators and uses only intensity modulator to take advantages of its larger modulation bandwidth for high signal baud-rate application such as single carrier DP-16QAM, as there are plenty of selections for intensity modulators with >40-GHz bandwidths.

Advantages of the system may include one or more of the following. By performing I/Q data de-correlation all-optically using PAM to QAM signal conversion, our system has several advantages. First, better signal performance can be obtained because there is no frequency dependent attenuation which can impact the signal as in RF cables. Secondly, compared other QAM emulators where QPSK is required as input, our system does not require the use of optical I/Q modulator. This way, either larger bandwidth can be achieved by using intensity modulators, or cost can be reduced by using intensity modulators with similar bandwidths. Moreover, unlike the QPSK to QAM conversion, the PAM to QAM signal translation only requires equal ratio splitting between the two arms of the optical delay interferometer, and the phase control can be easily monitored in real-time using simple method, reducing the complexity and cost even further. Overall, the system offers improved signal quality through better modulation and de-correlation, simpler DI operation. Since the input to the conversion process is not I/Q modulated, our system has the benefit of lower cost and lower complexity, because I/Q modulator won't be needed and the design and control mechanism of the DI is much simpler.

BRIEF DESCRIPTION OF THE DRAWINGS

The various novel features of the present system are illustrated in the figures listed below and described in the detailed description that follows.

DESCRIPTION

Figure 1:
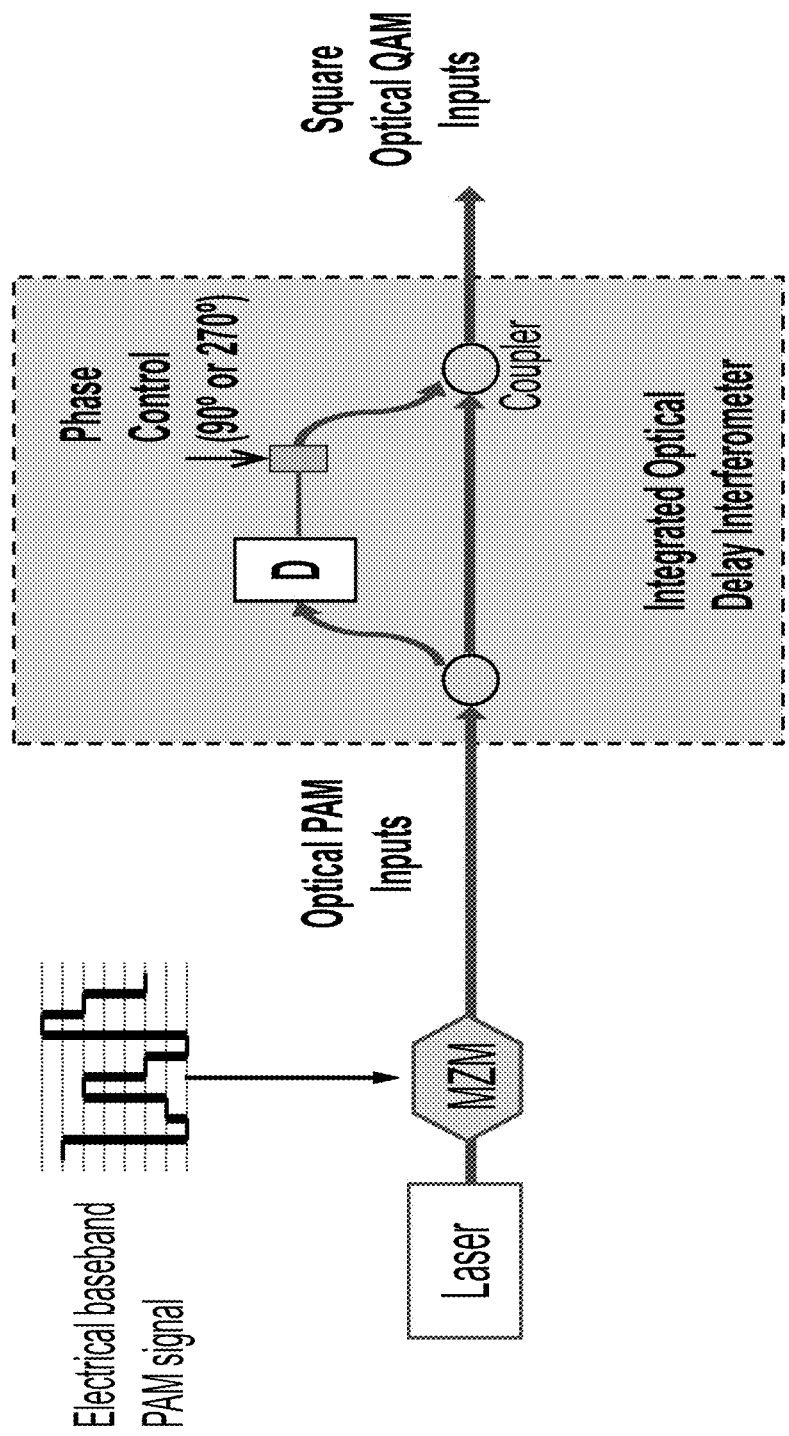
FIG. 1 shows a simplified diagram of one embodiment of an optical square QAM signal emulation using all-optical PAM to QAM signal conversion.

FIG. 1 shows a simplified diagram of the system. First, an optical CW laser is modulated with pulse amplitude modulation (PAM) by driving the intensity modulator (typically a Mach-Zehnder modulator, MZM) with electrical baseband PAM signal. The baseband PAM can be either generated by summing multiple binary signal with same bit-rate with precise amplitude ratios, or be the output of a digital analog converter (DAC). The pulse shape of the PAM signal, i.e. NRZ, RZ, or Nyquist pulse shaped, would not affect the result of the all-optical PAM to QAM conversion in our system.

Then, the optical PAM is converted to a square QAM signal (i.e. the number of constellation points is the same for every column and row) using an integrated optical delay interferometer (DI). The PAM signal is first split into two paths with equal splitting ratio in the optical DI for de-correlation. The amount of de-correlation between the I and Q copies of QAM signal can be designed through the path difference between the two arms. It just need to be multiple integer of the targeted QAM symbol rate so that the symbol edges will align correctly when the I and Q copies recombine. Moreover, the relative phase difference between the two arms is maintained to be either □/2 or 3□/2 to ensure the orthogonal operation between the two copies.

For QAM signal generation/emulation using only 1 set of baseband electrical PAM signal, the I/Q paths de-correlation is typically done in by RF delay line. By using DI for all-optical de-correlation, our approach avoids using the frequency dependent attenuation which could be severe in RF cabling. Our method also does not require optical I/Q modulators, which typically has higher costs and narrower modulation bandwidths compared to intensity modulators, for QAM signal emulation.

Compare to other known optical QAM emulation techniques, our method differs by not requiring an I/Q modulated signal as input. Other than cost saving during optical modulation, the amplitude and phase control of the DI during all-optical PAM to QAM conversion step is much simpler to handle since it requires only equal ratio splitting, and the phase setting can be optimized by equalizing the I and Q electrical stream amplitudes which are coherently detected using the same optical laser.

Using all-optical PAM to QAM conversion in DI allows us to perform optical de-correlation of the I and Q tributaries of the QAM signal and avoid frequency dependent attenuation in RF cabling which could impact signal quality.

Since the input to the conversion process is not I/Q modulated, our system has the benefit of lower cost and lower complexity, because I/Q modulator won't be needed and the design and control mechanism of the DI is much simpler. We provided the method of finding optimal phase control mechanism of the DI by monitoring and equalizing the down-converted I and Q electrical signal amplitudes, using coherent detection with the original laser as LO.

Figure 2:
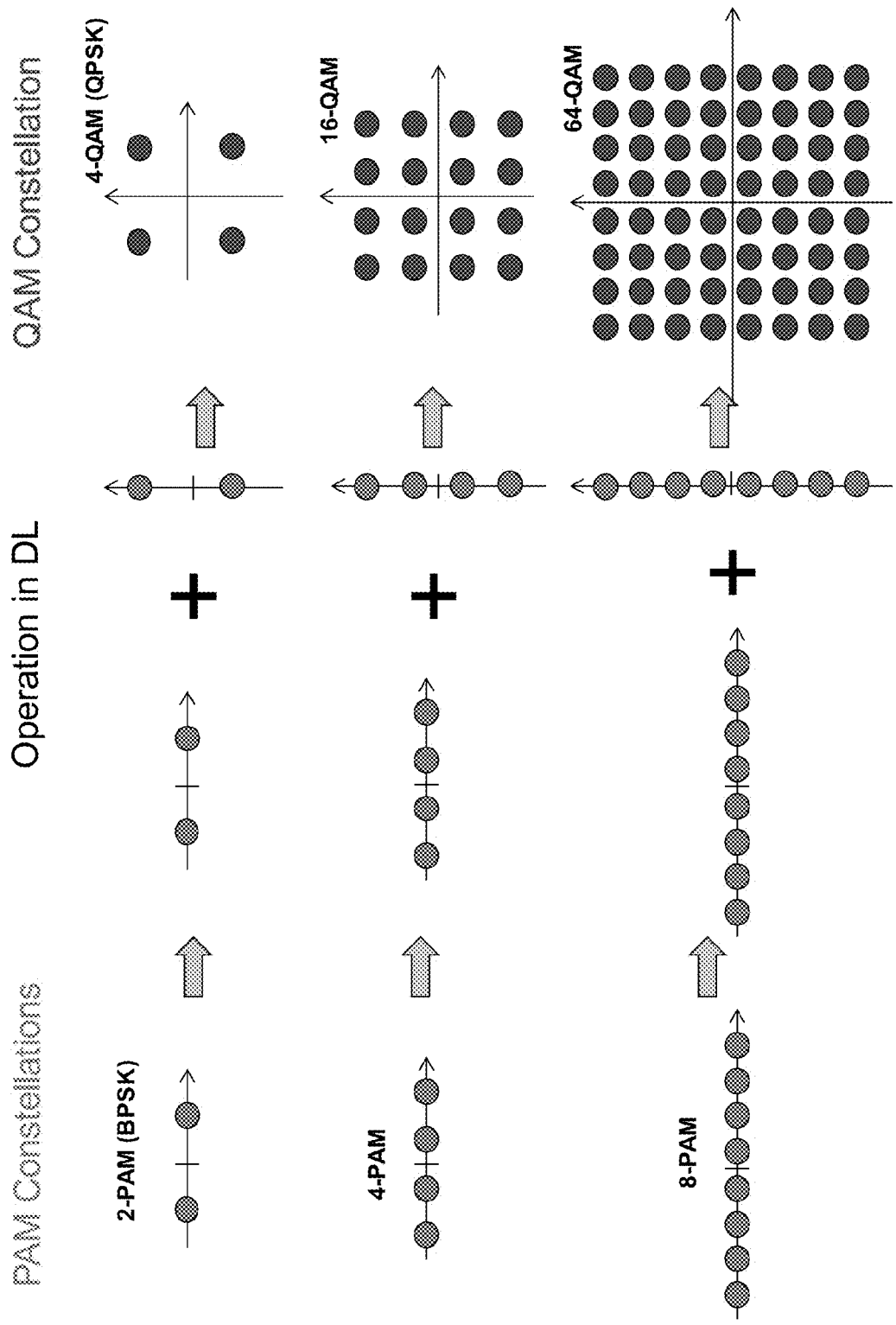
FIGS. 2-3 illustrate the operation of the PAM to QAM constellation conversion for different size QAM constellation maps.
Figure 3:
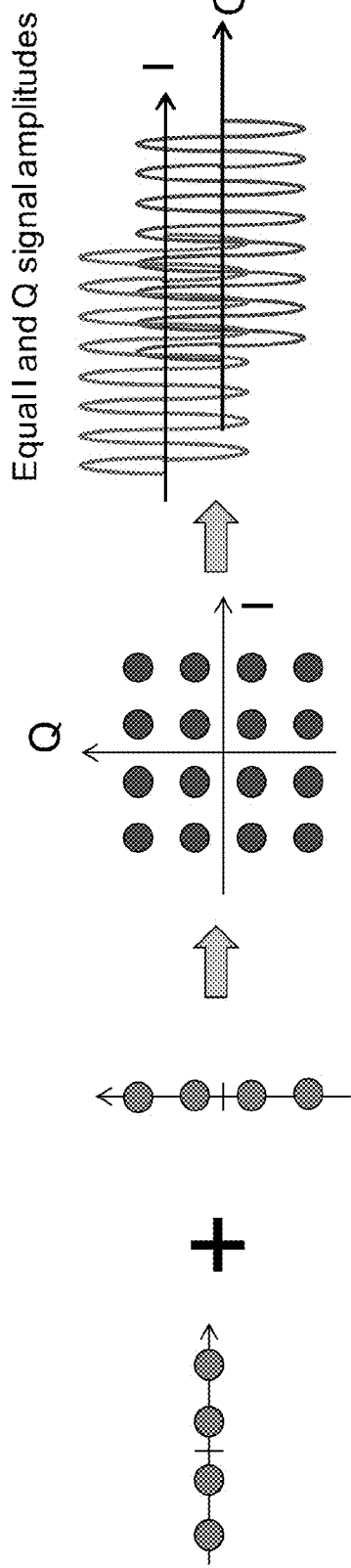
Figure 3:
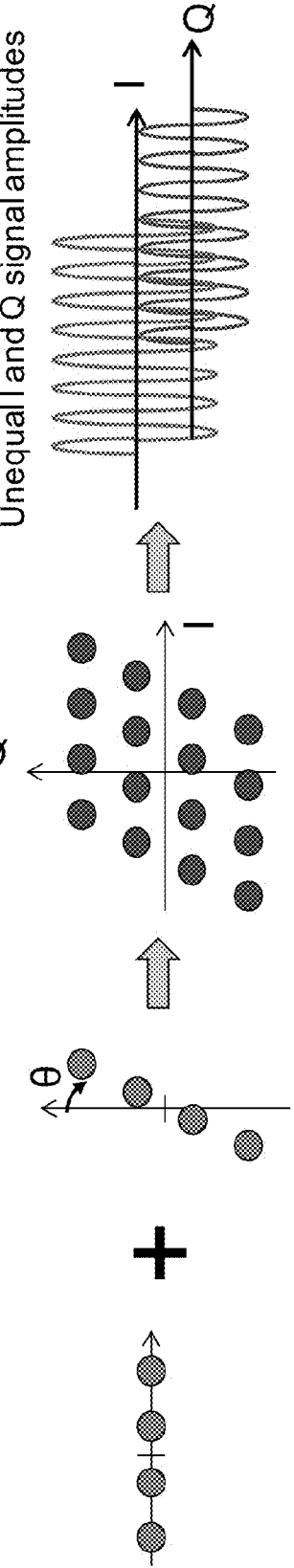

FIG. 2 illustrates how the PAM to QAM constellation conversion will work for different size QAM constellation maps. Since optical path delay is introduce to apply data de-correlation, the relative phase difference between the two arms will change for different input laser center frequency. For this purpose, we employs a simple method of tuning the phase, shown in FIG. 3, so that the To ensure that the relative phase difference of □/2. The generated QAM signal is first coherently detected and down convert to baseband by using the original CW laser as LO. The down-converted electrical I and Q signal amplitude is monitored. If the phase difference is □/2 and generated QAM has a square constellation, then the electrical I and Q amplitudes will be equal, even if the phase orientation of the coherent receiver is different than that of the signal. If the phase difference is off from □/2 by an angle □, and the resulted constellation is no longer square and exhibit I/Q imbalance, the I and Q amplitudes could have a differential ratio as large as $$\tan\left(\frac{\pi}{4} + \frac{\theta}{2}\right).$$

To optimize the signal constellation, the phase is simply adjusted so that the received I and Q will same signal amplitude simultaneous.

Figure 4:
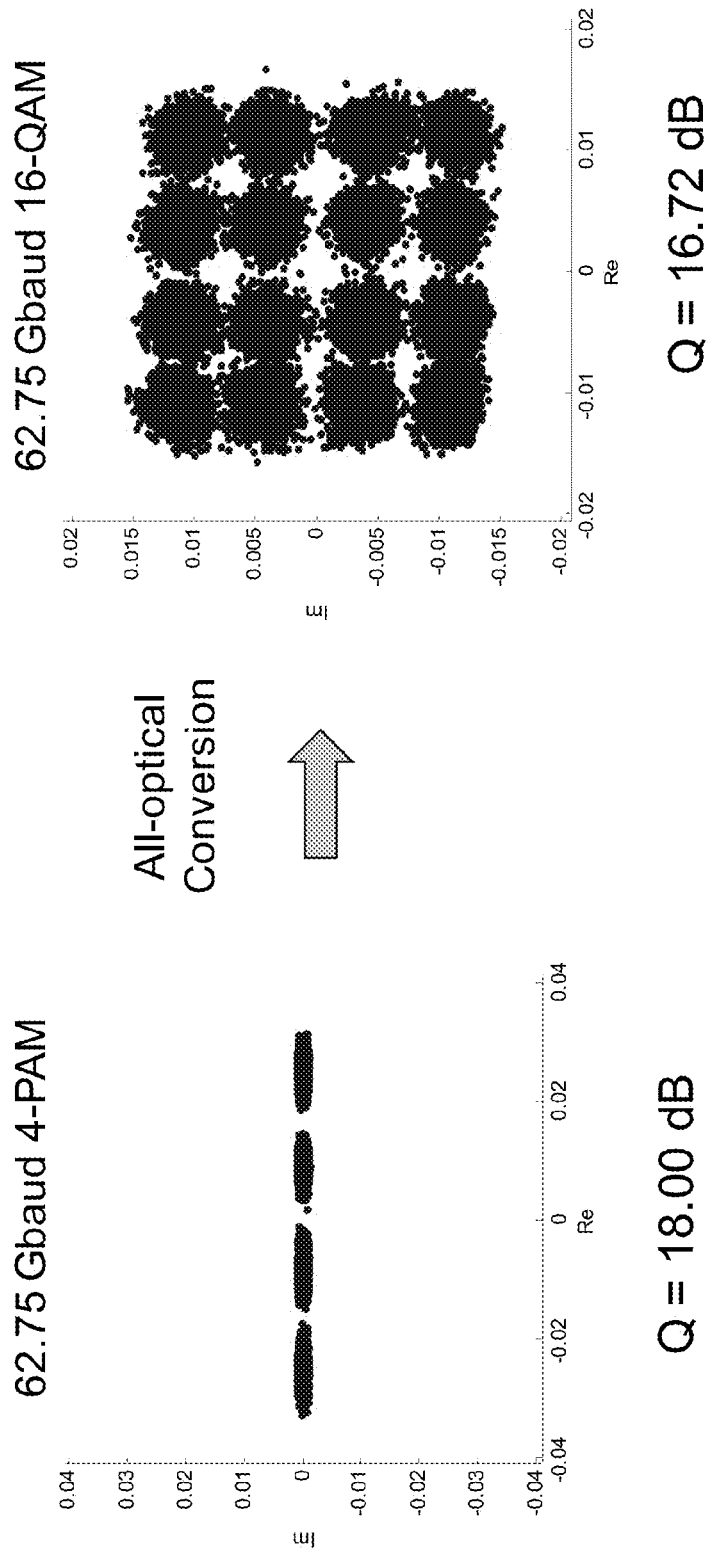
FIG. 4 shows an experimental result of the all-optical PAM to QAM signal conversion at a very high baud-rate of 62.75 GHz as an example.

FIG. 4 shows an experimental result of the all-optical PAM to QAM signal conversion at a very high baud-rate of 62.75 GHz as an example. The input 4-PAM optical signal has a Q-factor, defined as signal to noise ratio per symbol, of 18 dB. After converting to 16-QAM constellation using a DI, the Q-factor is only dropped by about 1.3-dB to 16.7 dB. The generated 16-QAM signal at 62.75-Gbaud symbol rate is enough for the evaluation of 400 Gb/s single carrier transmission system. This result shows the effectiveness of our system in generating high baud-rate QAM signal.

Figure 5:
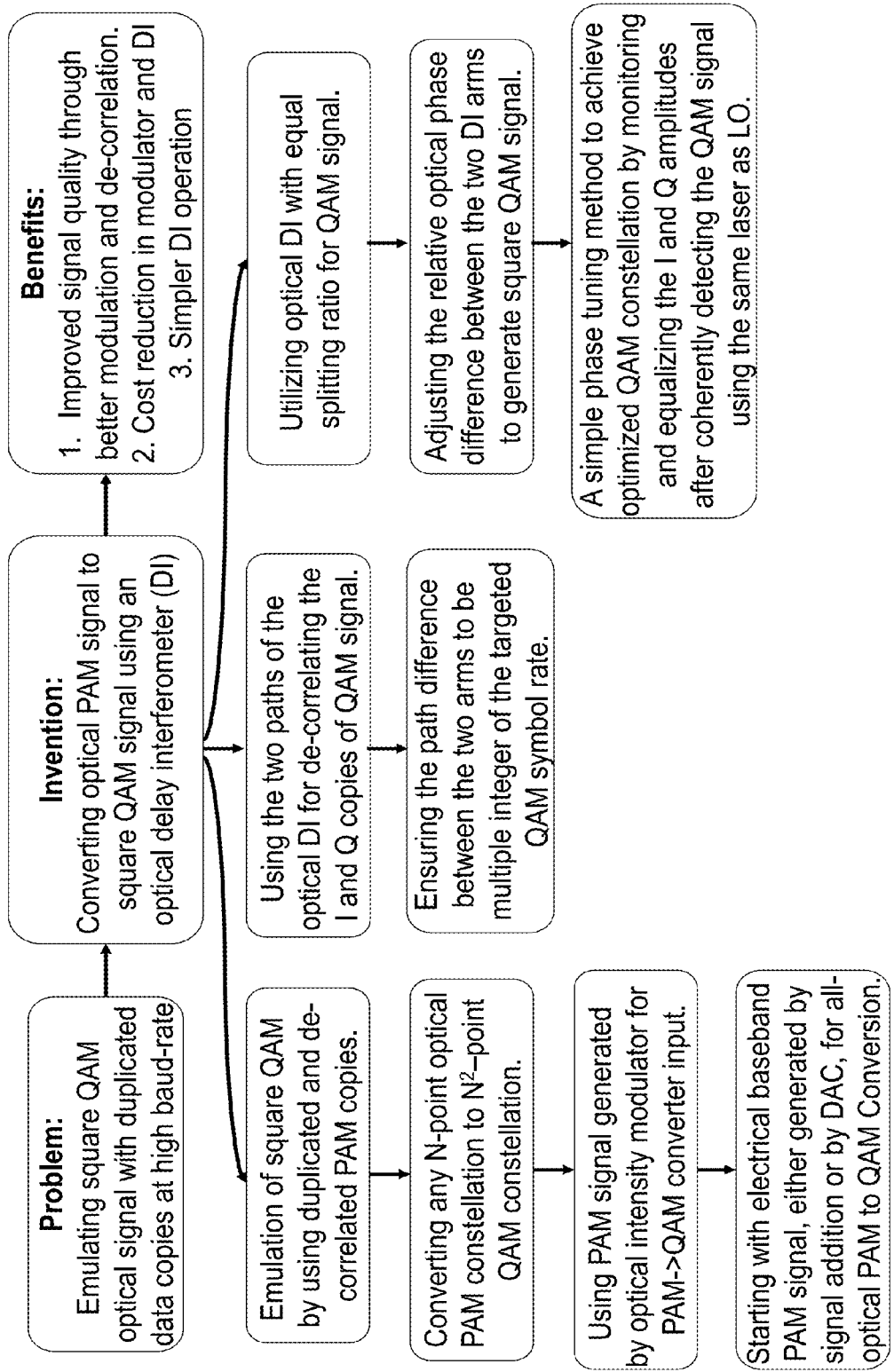
FIG. 5 shows an exemplary system for optical square QAM signal emulation using all-optical PAM to QAM signal conversion.

FIG. 5 shows an exemplary method for emulating a square QAM optical signal with duplicated data copies. The method includes emulating the square QAM by using duplicated and de-correlated PAM copies; converting any N-point optical PAM constellation to $N^2$ point PAM constellation; using the PAM signal generated by an optical intensity modulator for PAM to QAM converter input; and starting with the electrical baseband PAM signal (generated either by signal addition or by analog-to-digital converter), for optical PAM to QAM conversion. The method also includes using two arms of the optical DI for de-correlating the I and Q copies of the QAM signal; and ensuring the path difference between the two paths to be a multiple integer of a target QAM symbol rate. The method also includes using the optical DI with equal splitting ratio for QAM signal; adjusting the relative optical phase difference between the two DI arms to generate the square QAM signal; and a simple phase tuning to achieve optimized QAM constellation by monitoring and equalizing the I and Q amplitudes after coherently detecting the QAM signal using the same laser in a local oscillator (LO).

Although the present system has been described in connection with a particular embodiment thereof, those skilled in the art will appreciate that numerous adaptations and modifications may be made thereto without departing from the spirit and scope of the system as set forth in the claims.

What is claimed is:

1. An optical communication method, comprising:
   converting an optical pulse amplitude modulation (PAM) signal to a square QAM signal using an optical delay interferometer (DI) to perform all-optical PAM to QAM conversion in the DI without requiring an I/Q modulated signal as input;
   performing optical de-correlation of I and Q tributaries of the QAM signal to avoid frequency dependent attenuation in RF cabling which impacts signal quality;
   monitoring and equalizing down-converted I and Q electrical signal amplitudes, using coherent detection; and
   emulating a square quadrature amplitude modulation (QAM) optical signal with duplicated data copies, wherein the delayed interferometer provides signal decorrelation between the I and Q signal lanes at integer symbol length to emulate an optical QAM signal and using PAM modulation rate at the same baud rate as a QAM output signal and using an optical intensity modulator instead of an optical IQ modulator for an optical QAM emulation.

2. The method of claim 1, comprising emulating the square QAM by using duplicated and de-correlated PAM copies.

3. The method of claim 2, comprising converting any N-point optical PAM constellation to $N^2$ point PAM constellation.

4. The method of claim 2, comprising using the PAM signal generated by an optical intensity modulator for PAM to QAM converter input.

5. The method of claim 2, comprising starting with the electrical baseband PAM signal for optical PAM to QAM conversion.

6. The method of claim 5, comprising generating the PAM signal either by signal addition or by analog-to-digital converter.

7. The method of claim 1, comprising using two arms of the optical DI for de-correlating the I and Q copies of the QAM signal.

8. The method of claim 7, comprising ensuring the path difference between the two paths to be a multiple integer of a target QAM symbol rate.

9. The method of claim 1, comprising using the optical DI with equal splitting ratio for QAM signal.

10. The method of claim 9, comprising adjusting the relative optical phase difference between the two DI arms to generate the square QAM signal.

11. The method of claim 9, comprising performing phase tuning to achieve optimized QAM constellation by monitoring and equalizing I and Q amplitudes after coherently detecting the QAM signal using the same laser in a local oscillator (LO).

12. A communication system, comprising:
    a laser;
    an intensity modulator receiving electrical baseband PAM signals and driven by the laser without requiring an I/Q modulated signal as input;
    an integrated optical delay interferometer (DI) coupled to the intensity modulator to convert an optical pulse amplitude modulation (PAM) signal to a square quadrature amplitude modulation (QAM) signal to perform all-optical PAM to QAM conversion in the DI, wherein the DI performs optical de-correlation of I and Q tributaries of a QAM signal to avoid frequency dependent attenuation in RF cabling, wherein homodyne coherent detection of the QAM signal envelope using only one photo-detector, and an envelope of the coherently detected QAM signal is stable if coherently down-converted by the laser frequency, and the envelope fluctuations provide feedback to the QAM emulator for controlling a DI phase;
    means for equalizing down-converted I and Q electrical signal amplitudes, using coherent detection.

13. The system of claim 12, wherein the DI generates a square QAM optical signal with duplicated data copies.

14. The system of claim 12, wherein the DI emulates the square QAM by using duplicated and de-correlated PAM copies.

15. The system of claim 12, wherein the DI uses two arms of the optical DI for de-correlating the I and Q copies of the QAM signal.

16. The system of claim 12, wherein the DI uses the optical DI with equal splitting ratio for QAM signal.

17. The system of claim 16, wherein the relative optical phase difference between the two DI arms to generate the square QAM signal are adjusted.

18. The system of claim 17, comprising means for phase tuning to achieve optimized QAM constellation by monitoring and equalizing I and Q amplitudes after coherently detecting the QAM signal using the same laser in a local oscillator (LO).

* * * * *